Patented Oct. 16, 1923.

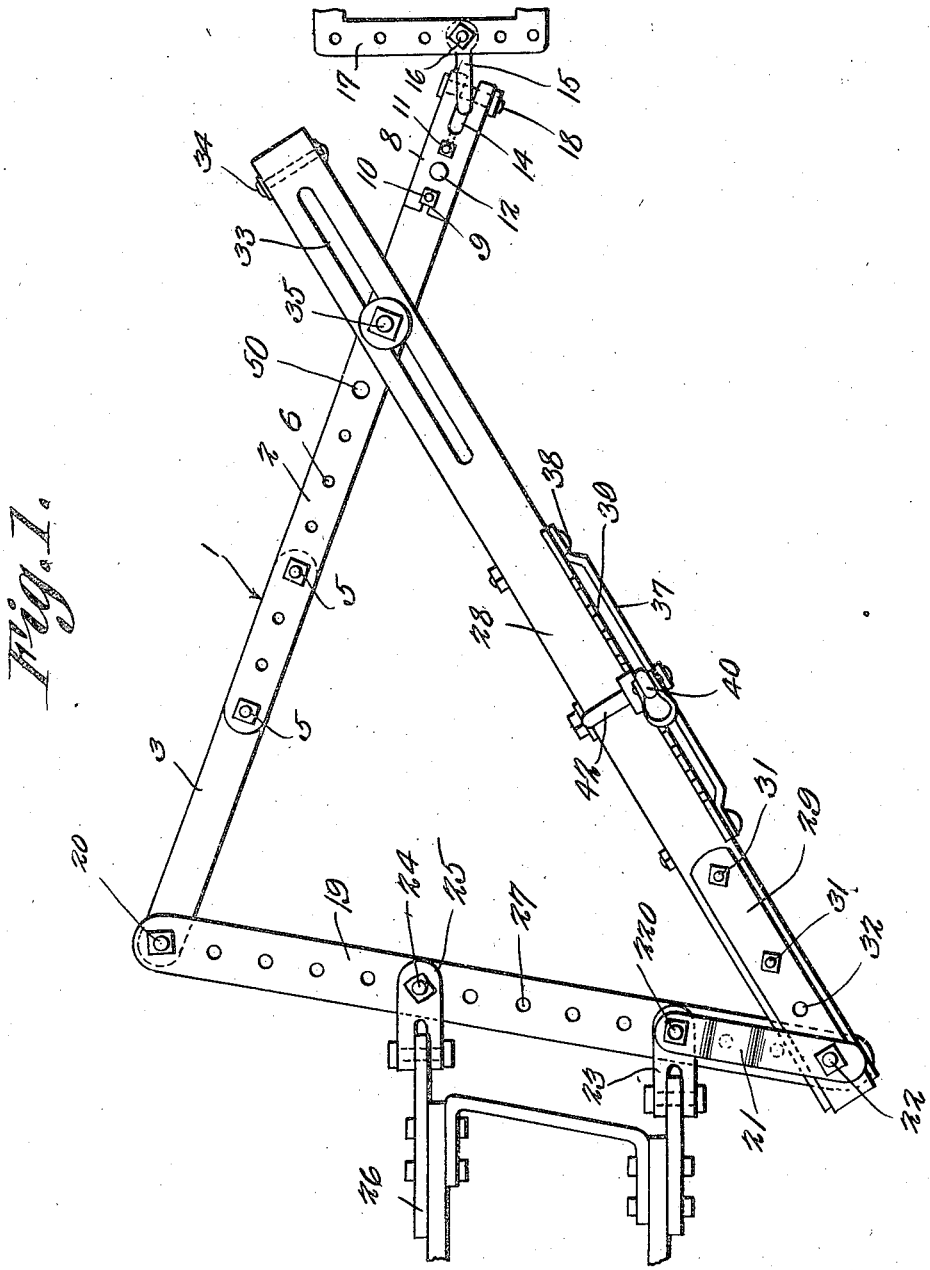

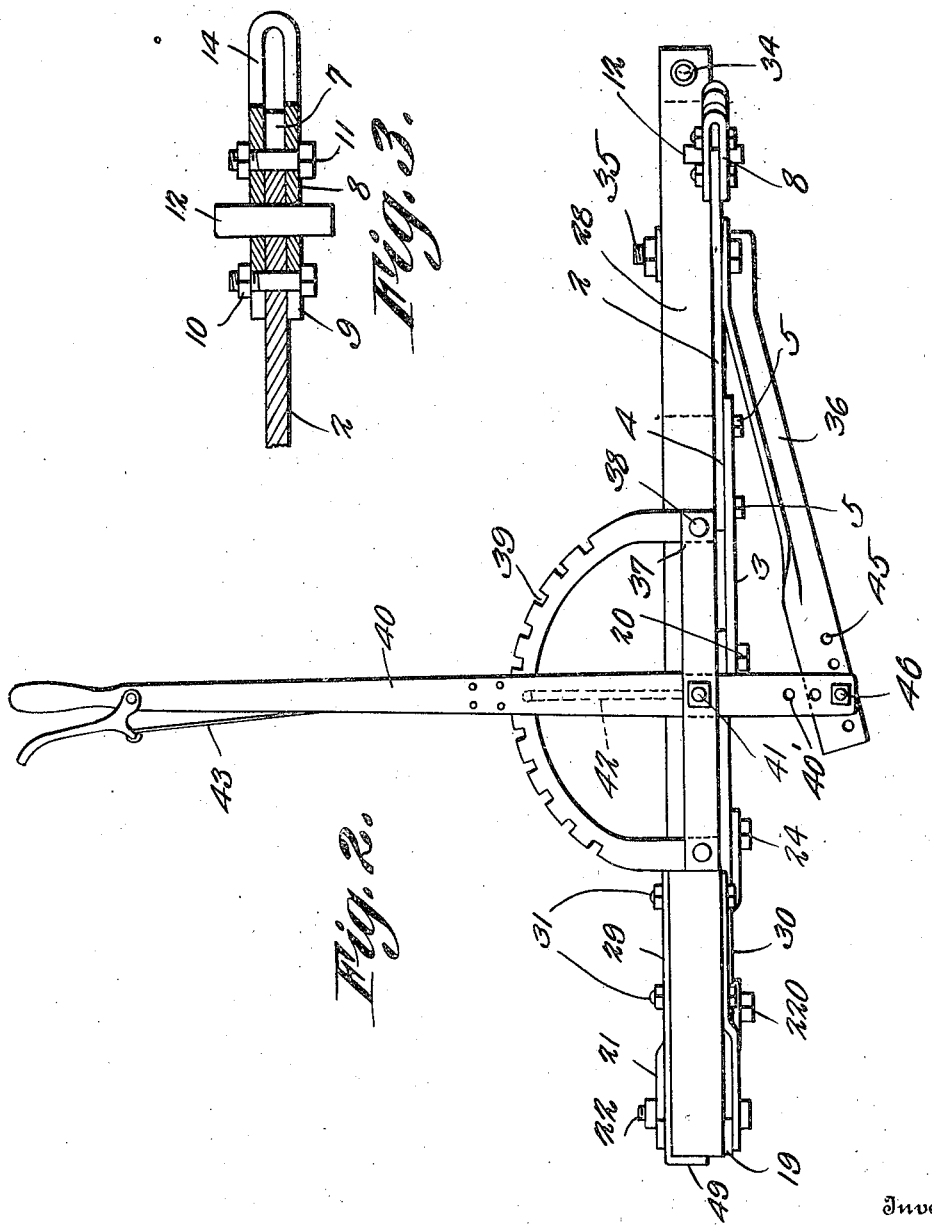

1,471,297

UNITED STATES PATENT OFFICE.

JOHN WANSING, OF META, MISSOURI.

PLOW HITCH.

Application filed December 23, 1920. Serial No. 432,754.

*To all whom it may concern:*

Be it known that I, JOHN WANSING, a citizen of the United States, residing at Meta, in the county of Osage and State of Missouri, have invented a new and useful Plow Hitch, of which the following is a specification.

The device forming the subject matter of this application is a plow hitch and the invention aims to provide a hitch which may be adjusted so as to regulate the thickness of a furrow slice when a plow is being operated on a side hill.

When a plow is drawn along a side hill, by a tractor, the forward end of the tractor can be kept in the furrow with a reasonable degree of accuracy. The hind end of the tractor, however, tends to slide downhill, and the plow, which is behind the tractor, sags off still more, the result being that the plow takes too much land.

The device forming the subject matter of this application is so constructed that the undesirable result above alluded to can be avoided.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment shown can be made without departing from the spirit of the invention.

In the accompanying drawings:—

Figure 1 shows in top plan, a device constructed in accordance with the invention; Figure 2 is an elevation, looking in the direction of the arrow in Figure 1; and Figure 3 is a fragmental longitudinal section taken through one end of the traction bar.

The numeral 1 denotes a traction bar comprising parts 2 and 3 having their inner ends overlapped and connected by bolts 5, the part 2 having a plurality of holes 6 for the reception of the bolts 5, to the end that an adjustment in the length of the traction bar 1 may be made. In the forward end of the part 2 of the traction bar 1 there is a slot 7. The forward end of the part 2 of the traction bar 1 is received in a U-shaped coupling 8. In the rear end of the coupling 8 there is a slot 9. A securing element 10 is mounted in the part 2 and is received in the slot 9. A securing element 11 is mounted in the coupling 8 and is received in the slot 7. The securing elements 10 and 11 hold the coupling 8 on the part 2 but do so with a frictional hold only. The strain is carried, for the most part, by a shearing pin 12 inserted through the arms of the coupling 8 and through the part 2 as shown in Figure 3, the function of a shearing pin, in a device of this kind, being understood clearly by those skilled in the art. In the forward end of the coupling 8 there is an opening 14 receiving a clevis 15 connected at 16 to a part 17 of a tractor. A connecting bolt 18 is mounted in the clevis 15 and is engaged with the forward end of the coupling 8.

The numeral 19 denotes a plow-carrying bar disposed at an angle to the traction bar 1. A pivot element 20 unites the bars 19 and 1. A bracket 21 is mounted on one end of the bar 19 and is held thereto by bolts 22 and 220. A clevis 23 is mounted on the bolt 220. A bolt 24 connects a clevis 25 with the bar 19. The clevises 25 and 23 form means whereby a plow 26 may be connected to the bar 19 of the plow hitch. For the sake of adjustment, a plurality of openings 27 are formed in the bar 19, for the reception of the bolts 24, 22 and 220.

The numeral 28 denotes a third bar, located at an angle to the bars 19 and 1. The forward end of the bar 28 extends across the bar 1. On the rear end of the bar 28 there is a wear strip 29 having a downturned end 49 engaging the end of the bar 28, for reinforcement. On the lower edge of the bar 28 there is a bracket 30. Securing elements 31 connect the bracket 30 and the wear strip 29 with the bar 28. The plow-carrying bar 19 is received, at one end, between one end of the bracket 30 and the corresponding end of the member 28 (see Figure 2). The wear strip 29 passes beneath the outer end of the bracket 21. The pivot bolt 22 passes through the parts 29, 28 and 30. The said parts may have a plurality of holes 32 (Figure 1) for the reception of the bolt 22.

That end of the bar 28 which extends across the bar 2 is provided with an elongated slot 33. A bolt 34 extends through the bar 28 at the forward end thereof, to prevent the said bar from splitting outwardly from the slot 34. A guide bolt 35 is mounted slidably in the slot 33 and is held in the part 2 of the traction bar 1, and said part 2 having a plurality of openings 50, adapted to receive the bolt 35 for adjustment. The guide bolt 35 constitutes means for securing the forward end of a downwardly and rearwardly inclined brace 36 to the bar 1, the brace 36 being located beneath the bar 28. A frame 37 is attached by securing elements 38 to the bar 28 and comprises a segment 39. A lever 40 is pivoted at 41 to the frame 37 and to the bar 28, the segment 39 being sustained from the bar 28 by means of a brace 42. The lever 40 carries a latch mechanism 43 cooperating with the segment 39. In the lower end of the lever 40 there are a plurality of openings 40'. Any one of these openings is adapted to cooperate with one of a plurality of openings 45 in the rear end of the brace 36. The cooperating openings 40 and 45 receive a pivot element 46, in the form of a bolt, connecting the lower end of the lever 40 with the brace 36, and, consequently, with the traction bar 1.

It will be clear that by shifting the lever 40, the bar 28 will be moved endwise and will slide transversely of the bar 1, on the guide bolt 35, it being possible to hold the parts in adjusted positions, by engaging the latch mechanism 43 with the segment 39. When the contour of the plow hitch is altered, as above explained, the position of the plow 26 with respect to the tractor 17 will be changed accordingly. The device affords a simple means whereby without shifting the positions of bolts, or making other time consuming adjustments, the position of a plow may be regulated, on a side hill, so as to cause the plow to take in more or less land, as explained in the opening portion of this specification.

Having thus described the invention, what is claimed is:

A plow hitch comprising a traction bar including relatively movable parts permitting an adjustment in the length of the bar; means for holding said parts of the bar against relative movement and in adjusted positions; a plow-carrying bar pivoted to the traction bar; a third bar; means for pivotally connecting the plow-carrying bar with the third bar at adjusted points longitudinally of the third bar; means for mounting the third bar slidably on the traction bar; a frame extended longitudinally of the outer edge of the third bar and spaced therefrom, the frame constituting a reinforcement for the third bar; a pivot element carried by the frame and located in horizontal alinement with the third bar; a lever mounted to swing on the pivot element; a brace connected to the traction bar and extended longitudinally of the third bar; and means for connecting the lever pivotally with the brace at adjusted points longitudinally of the brace.

In testimony that I claim the foregoing as my own, I have hereto affixed my signature in the presence of two witnesses.

JOHN WANSING.

Witnesses:
FRANK OTKE,
H. W. SCHMEER.